United States Patent [19]
Yost et al.

[11] Patent Number: 6,097,959
[45] Date of Patent: Aug. 1, 2000

[54] SYSTEM AND METHOD FOR ACCURATE POSITIONING OF MOBILE TERMINALS

[75] Inventors: George P. Yost, DeSoto; Shankari Panchapakesan, Dallas, both of Tex.

[73] Assignee: Ericsson Inc., Research Triangle Park, N.C.

[21] Appl. No.: 09/015,135

[22] Filed: Jan. 29, 1998

[51] Int. Cl.[7] .................................. G01S 3/02; H04B 7/00
[52] U.S. Cl. ........................ 455/456; 455/67.1; 342/357
[58] Field of Search ..................................... 455/456, 457, 455/421, 422, 67.1, 67.6, 69; 370/324, 519; 342/457, 357, 450, 451, 461, 463

[56] References Cited

U.S. PATENT DOCUMENTS

| | | | |
|---|---|---|---|
| 3,848,254 | 11/1974 | Drebinger et al. | 343/112 R |
| 5,508,708 | 4/1996 | Ghosh et al. | 342/457 |
| 5,717,406 | 2/1998 | Sanderford et al. | 342/457 |
| 5,945,948 | 8/1999 | Buford et al. | 455/422 |
| 5,960,341 | 9/1999 | LeBlanc et al. | 455/456 |

FOREIGN PATENT DOCUMENTS

| | | |
|---|---|---|
| 44 09 178 A1 | 9/1995 | Germany . |
| WO 97/27711 | 7/1997 | WIPO . |
| WO 98/34426 | 8/1998 | WIPO . |

OTHER PUBLICATIONS

George P. Yost and Shankari Panchapakesan; *Improvement in Estimation of Time of Arrival (TOA) from Timing Advance (TA)*; IEEE International Conference on Universal Personal Communications, Florence, vol. 2, Oct. 5–9, 1998; pp. 1367–1372.

PCT International Search Report dated May 14, 1999.

*Primary Examiner*—Reinhard J. Eisenzopf
*Assistant Examiner*—Lester G. Kincaid
*Attorney, Agent, or Firm*—Jenkens & Gilchrist, P.C.

[57] ABSTRACT

A telecommunications system and method is disclosed for improving the accuracy of the Time of Arrival (TOA) information extracted from the Timing Advance (TA) values reported by base stations. This can be accomplished by utilizing an average of m (m=2 or more) consecutive TA values, which will on average have a smaller mean-squared error than using a single TA value. By averaging multiple consecutive TA values to obtain a single measurement of TOA, the accuracy of the location algorithm employing the TOA information can be improved, and thus, the geographical location of a mobile terminal within a cellular network can be more accurately determined. The improvement in the accuracy of the location of the mobile terminal can be applied to both a stationary mobile terminal and a moving mobile terminal.

16 Claims, 5 Drawing Sheets

SYSTEM AND METHOD FOR ACCURATE POSITIONING OF MOBILE TERMINALS

BACKGROUND OF THE PRESENT INVENTION

1. Field of the Invention

The present invention relates generally to telecommunications systems and methods for determining the geographical position of a mobile terminal within a cellular network, and specifically to accurately determining Time of Arrival values from timing advance values, which can then be utilized to estimate the location of the mobile terminal.

2. Background and Objects of the Present Invention

Cellular telecommunications is one of the fastest growing and most demanding telecommunications applications ever. Today it represents a large and continuously increasing percentage of all new telephone subscriptions around the world. A standardization group, European Telecommunications Standards Institute (ETSI), was established in 1982 to formulate the specifications for the Global System for Mobile Communication (GSM) digital mobile cellular radio systems.

Figure 1:
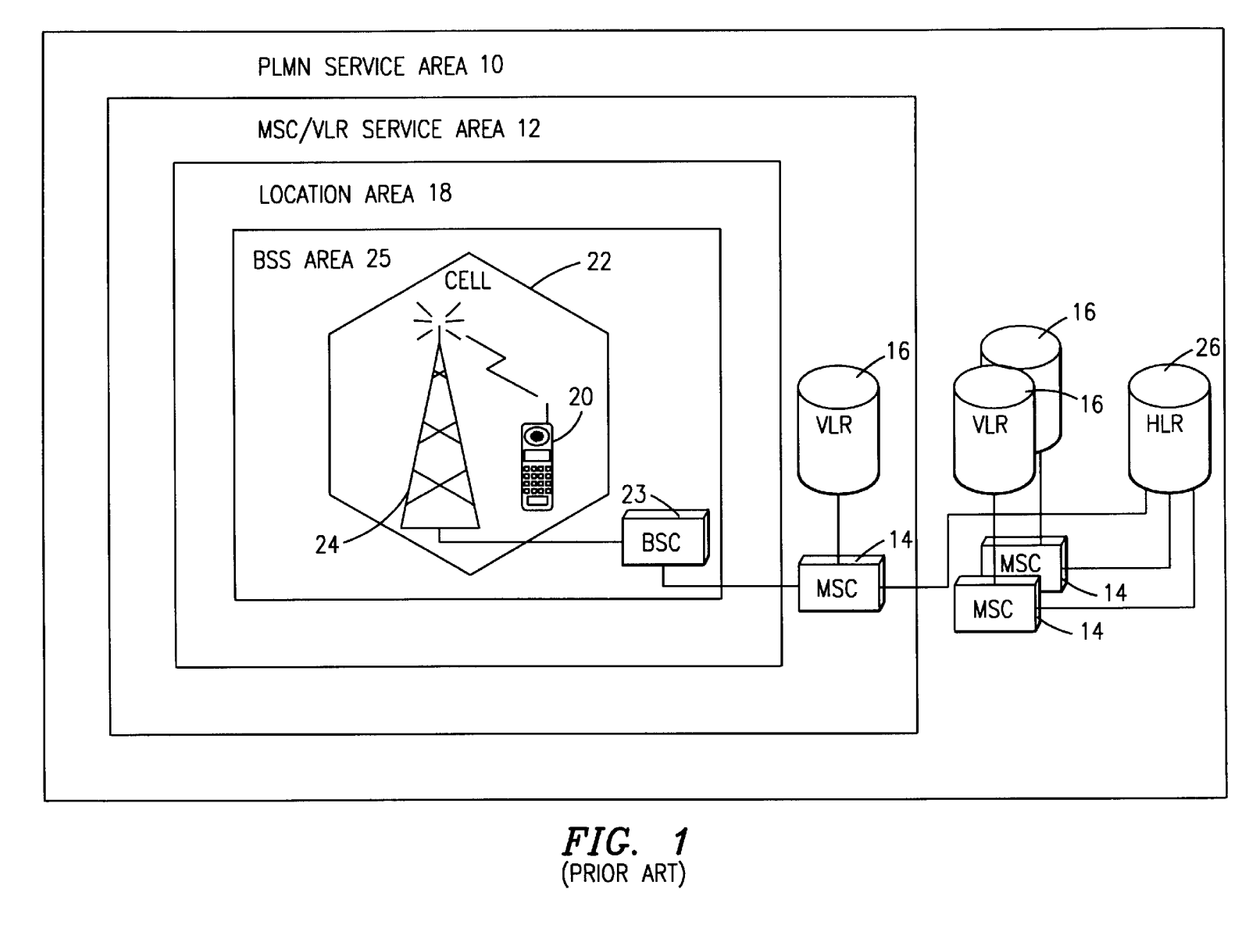
FIG. 1 is a block diagram of a conventional terrestrially-based wireless telecommunications system.

With reference now to FIG. 1 of the drawings, there is illustrated a GSM Public Land Mobile Network (PLMN), such as cellular network 10, which in turn is composed of a plurality of areas 12, each with a Mobile Switching Center (MSC) 14 and an integrated Visitor Location Register (VLR) 16 therein. The MSC/VLR areas 12, in turn, include a plurality of Location Areas (LA) 18, which are defined as that part of a given MSC/VLR area 12 in which a mobile station (MS) (terminal) 20 may move freely without having to send update location information to the MSC/VLR area 12 that controls the LA 18. Each Location Area 12 is divided into a number of cells 22. Mobile Station (MS) 20 is the physical equipment, e.g., a car phone or other portable phone, used by mobile subscribers to communicate with the cellular network 10, each other, and users outside the subscribed network, both wireline and wireless.

The MSC 14 is in communication with at least one Base Station Controller (BSC) 23, which, in turn, is in contact with at least one Base Transceiver Station (BTS) 24. The BTS is the physical equipment, illustrated for simplicity as a radio tower, that provides radio coverage to the geographical part of the cell 22 for which it is responsible. It should be understood that the BSC 23 may be connected to several base transceiver stations 24, and may be implemented as a stand-alone node or integrated with the MSC 14. In either event, the BSC 23 and BTS 24 components, as a whole, are generally referred to as a Base Station System (BSS) 25.

With further reference to FIG. 1, the PLMN Service Area or cellular network 10 includes a Home Location Register (HLR) 26, which is a database maintaining all subscriber information, e.g., user profiles, current location information, International Mobile Subscriber Identity (IMSI) numbers, and other administrative information. The HLR 26 may be co-located with a given MSC 14, integrated with the MSC 14, or alternatively can service multiple MSCs 14, the latter of which is illustrated in FIG. 1.

The VLR 16 is a database containing information about all of the Mobile Stations 20 currently located within the MSC/VLR area 12. If a MS 20 roams into a new MSC/VLR area 12, the VLR 16 connected to that MSC 14 will request data about that Mobile Station 20 from the HLR database 26 (simultaneously informing the HLR 26 about the current location of the MS 20). Accordingly, if the user of the MS 20 then wants to make a call, the local VLR 16 will have the requisite identification information without having to reinterrogate the HLR 26. In the aforedescribed manner, the VLR and HLR databases 16 and 26, respectively, contain various subscriber information associated with a given MS 20.

The digital GSM system uses Time Division Multiple Access (TDMA) to handle radio traffic in each cell 22. TDMA divides each frequency (carrier) into eight time slots (physical channels). However, with other TDMA systems, more or less time slots can be used. For example, in the D-AMPS system, each frequency is divided into three time slots. Logical channels are then mapped onto these physical channels. Examples of logical channels include traffic (speech) channels (TCH) and Control Channels (CCH).

Figure 2:
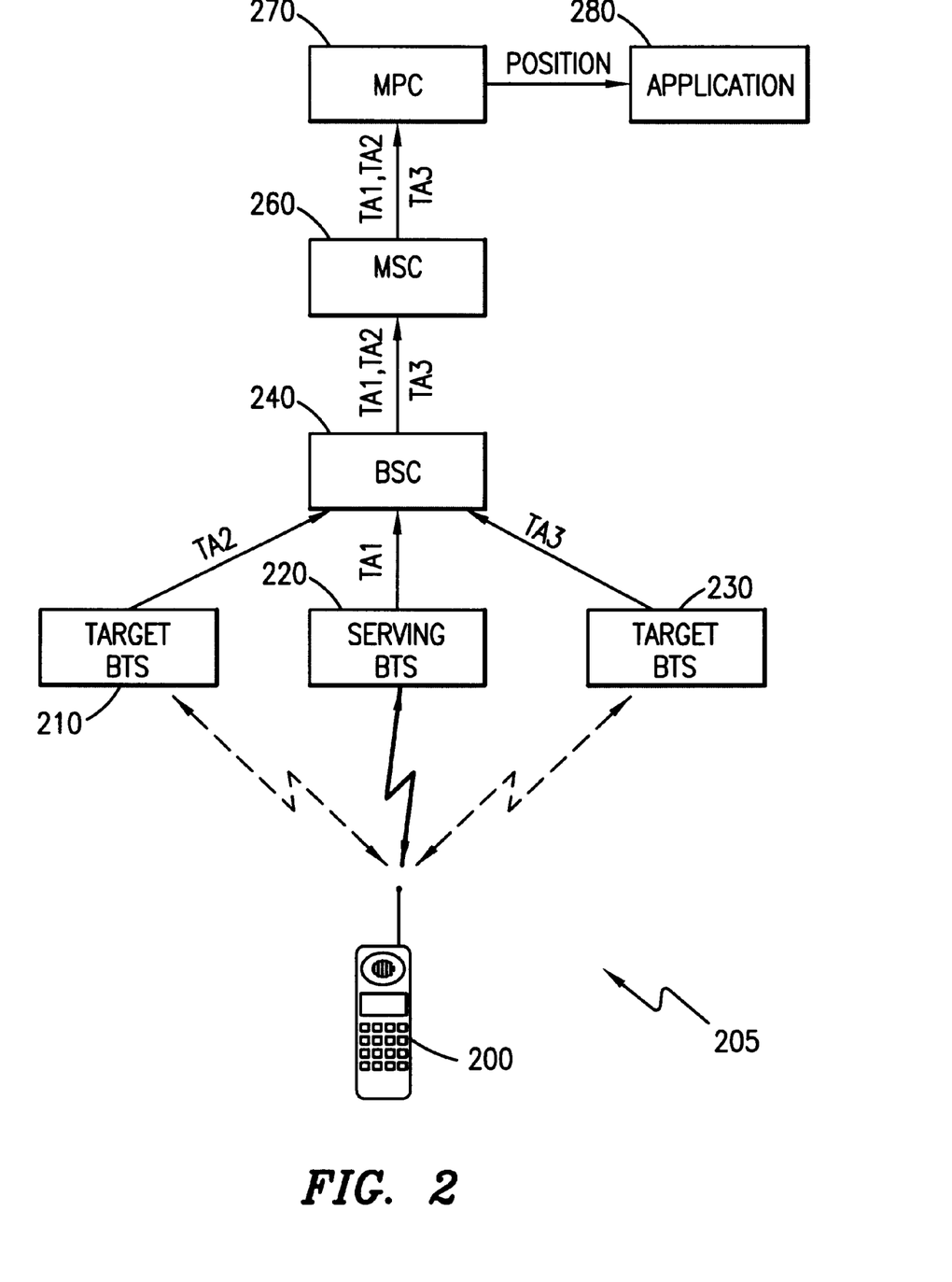
FIG. 2 illustrates the acquisition of positioning data by base station systems to determine the geographical location of a mobile terminal within a cellular network.

Pursuant to a recent Federal Communications Commission (FCC) Ruling and Order, cellular phone service providers within the United States must provide by October 2001 the capability to locate the position of a cellular phone making an emergency (911) call within the provider's system to within 125 meters with about 67% probability. Currently, as can be seen in FIG. 2 of the drawings, upon a network positioning request, the Base Station System (BSS) (220 and 240) serving the MS 200 generates positioning data, which is delivered to the Mobile Switching Center (MSC) 260. This positioning data is then forwarded to a Positioning Center (PC) 270 for calculation of the geographical location of the MS 200. The location of the MS 200 can then be sent to the application 280 within the network that requested the positioning.

In order to accurately determine the location of the MS 200, positioning data from each separate Base Transceiver Station (illustrated by 210, 220, and 230) within range is required. The minimum number of such positioning data from each BTS (210, 220 and 230) depends upon the positioning algorithm used, the accuracy desired, and other considerations. This positioning data for GSM systems can include a Timing Advance (TA) value, which corresponds to the amount of time in advance that the MS 200 must send a message in order for the BTS 220 to receive it in the time slot allocated to that MS 200.

It should be understood, however, that any estimate of distance can be used, instead of the TA value of GSM and other Time Division Multiple Access (TDMA) systems. When a message is sent from the MS 200 to the BTS 220, there is a propagation delay, which depends on the distance between the MS 200 and the BTS 220. This delay is commonly referred to as Time of Arrival (TOA). TOA is measured by the system with a certain error. Often, the TOA measurements are not available, therefore TA values can be used as an estimation of the TOA. TA values are expressed in bit periods, which, for GSM systems, can range from 0 to 63, with each bit period corresponding to approximately 550 meters of the distance between the MS 200 and the BTS 220.

Figure 3:
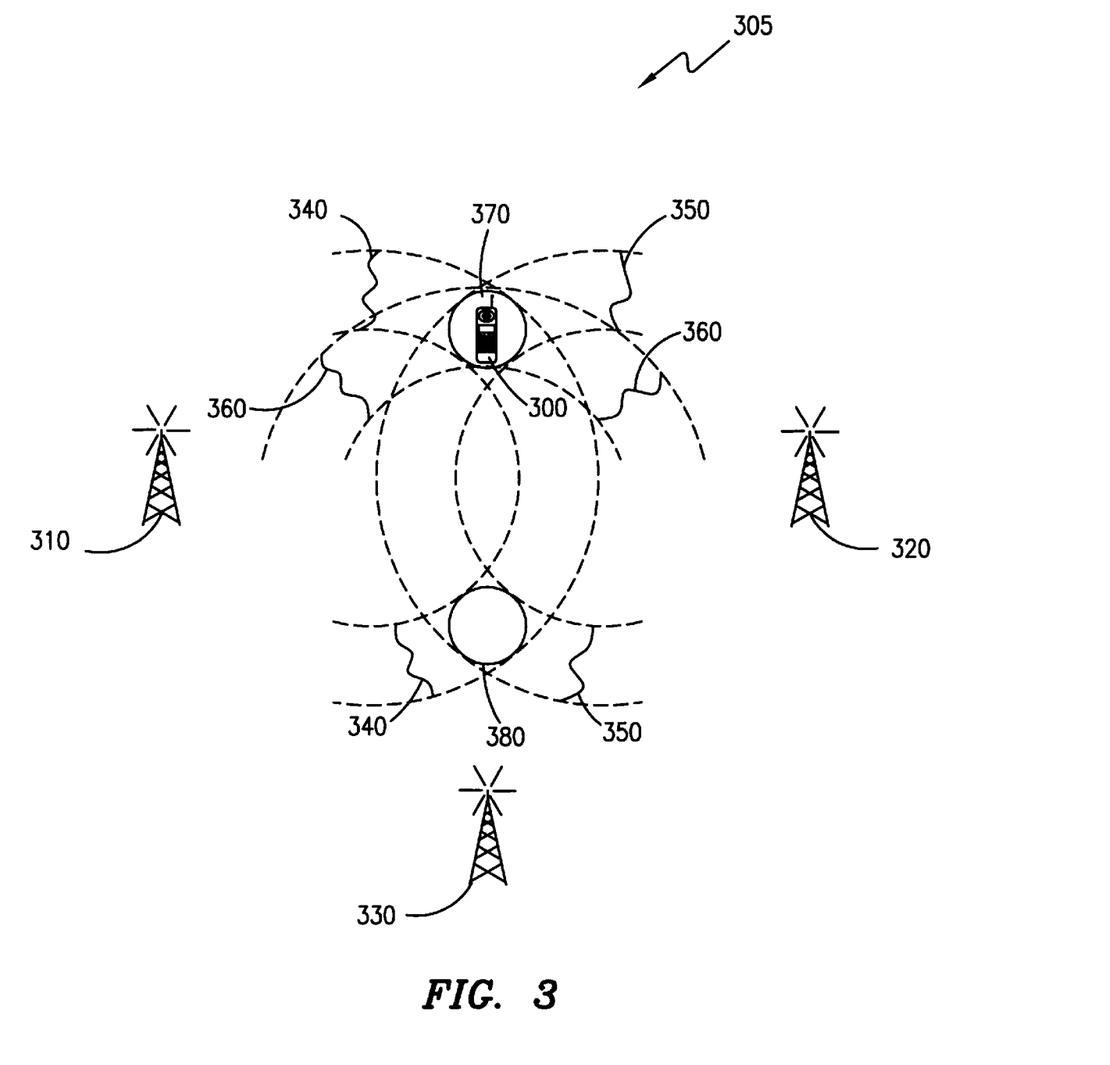
FIG. 3 illustrates positioning of a mobile terminal within a cellular network based upon Timing Advance (TA) values taken from receiving base station systems.

Once a TA value is determined for one BTS 220, the distance between the MS 200 and that particular BTS 220 is known, but the actual location is not. If, for example, in the GSM system, the TA value equals one, the MS 200 could be anywhere in an annular region from a radius of 550 meters to a radius of 1100 meters. Two TA values from two BTSs, for example, BTSs 210 and 220, provide two possible regions where the MS 200 could be located (where the two annuluses intersect), which can be seen in FIG. 3 as regions 370 and 380. However, with three TA values from three BTSs, e.g., BTSs 210, 220, and 230, the location of the MS 200 can be uniquely determined with a certain degree of accuracy, as shown in FIG. 3 as region 370. Using an appropriate algorithm, with knowledge of the three TA values and site location data associated with each BTS (210, 220, and 230), the position of the mobile station 200 can unambiguously (except for certain geometrical configurations) be determined (with a certain accuracy) by the Positioning Center 270.

Therefore, Timing Advance (TA) values are obtained from the original (serving) BTS 220 and two or more neighboring (target) BTSs (210 and 230). By utilizing Timing Advance (TA) values, Automatic Location Identification (ALI) can be accomplished using currently-available mobile terminals and implementing relatively inexpensive modifications to the base station hardware and software. TA values may be used as an approximation for TOA (Time of Arrival—the transmit time from MS to BTS), which implies that any errors in the TA information are inherited by the triangulation algorithm used for locating the MS. For example, the BSS measures TOA with a certain standard error, and this measurement is used to assign the time slot. However, the TOA measurement error made by the BSS may be large enough such that the wrong TA time slot is assigned, i.e., the time slot does not bracket the true value of TOA. This will cause the accuracy of the algorithm using the TOA information extracted from the reported TA to deteriorate.

It is therefore an object of the invention to improve the accuracy of the Time of Arrival information extracted from the Timing Advance values reported by the Base Station Systems in order to more accurately determine the geographical location of a mobile terminal within a cellular network.

It is a further object of the invention to help comply with the recent Federal Communications Commission (FCC) Ruling and Order to locate the position of a cellular phone making an emergency (911) call within the provider's system to within 125 meters with about 67% probability.

SUMMARY OF THE INVENTION

The present invention is directed to telecommunications systems and methods for improving the accuracy of the Time of Arrival (TOA) information extracted from the Timing Advance (TA) values reported by the Base Station System (BSS) by utilizing an average of m (m=2 or more) consecutive TA values, which will on average have a smaller mean-squared error than using a single TA value. There can be a significant difference in the average mean-squared error between using a single TA value and an average of multiple TA values. By averaging multiple consecutive TA values to obtain a single measurement of TOA, the accuracy of the location algorithm employing the TOA information can be improved, and thus, the geographical location of a mobile terminal within a cellular network can be more accurately determined.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF THE PRESENTLY PREFERRED EXEMPLARY EMBODIMENTS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

With reference now to FIG. 3 of the drawings, in Time Division Multiple Access (TDMA) systems, for example, a Global System for Mobile Communications (GSM) system 305, Timing Advance (TA) information is reported approximately twice every second by Mobile Stations 300 and is a number ranging from 0–63, with each number corresponding to approximately a 550 meter radial distance from a receiving Base Transceiver Station (BTS) (310, 320 or 330) or other antenna, each of which is connected to a Base Station Controller (BSC) (not shown). In other TDMA systems, the width may be much larger and the frequency of measuring the TA values may differ widely.

The Timing Advance information obtained from the serving BTS 310 and surrounding BTS's (320 and 330) is used as an approximation for the actual Time of Arrival (TOA) of the signal from the MS 300. Each TA value corresponds to a circular contour (340, 350 and 360) around each receiving BTS (310, 320 and 330 respectively) representing the locus of all possible locations of the MS 300. The actual location of the MS 300 lies at the best intersection 370 of all the respective circular contours (340, 350 and 360) in the least-squares sense. Intersection 380 is shown to illustrate the necessity for at least three circular contours (340, 350 and 360). The TOA accuracy is reflected in the positioning accuracy. Therefore, the TOA accuracy, and thus the accuracy of the location of the MS 300 is directly related to the accuracy of the TA information obtained by the receiving BTS's (310, 320 and 330).

In order to improve the accuracy of the TOA information reported by the receiving BTS's (310, 320 and 330), and thus the accuracy of the position of the MS 300, an average of multiple TA values can be used to obtain a single measurement of TOA, which will have a smaller mean-squared error than a TOA extracted from a single TA value.

Therefore, for the case of the stationary MS 300, let $\tau$ denote the unknown actual transit time (TOA) for a radio signal to travel from the MS 300 to one of the receiving BTS's 310. A processor, within, for example the connected respective BSC, measures $\tau$ with a random error a, and from this establishes the TA value as time slot i, which for GSM systems can range from 0–63. In practical applications, each time slot (TA value) is associated with a certain width T, called a bit period, which for GSM systems corresponds to 550 radial meters from the BTS 310. The actual transit time τ must then be inferred from the time slot i, taking into consideration both the measurement error σ due to errors in equipment and multipath and the time slot width T.

Figure 4A:
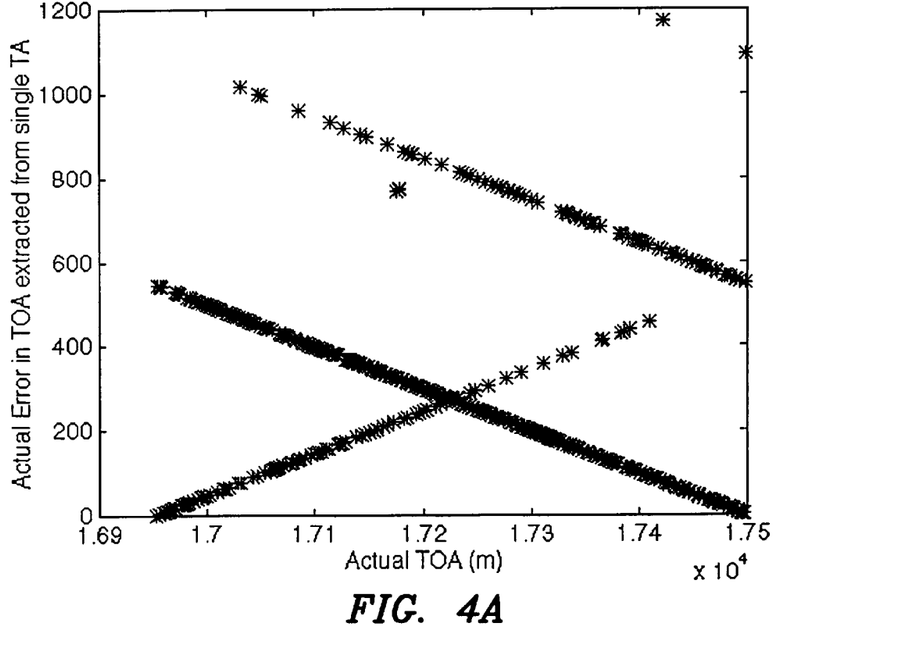
FIGS. 4A, 4B and 4C show typical behavior of the error of the actual Time of Arrival (TOA) of a radio signal from a mobile terminal to a base station system extracted from the reported TA values for one or more averaged consecutive TA values in a sample situation.
Figure 4B:
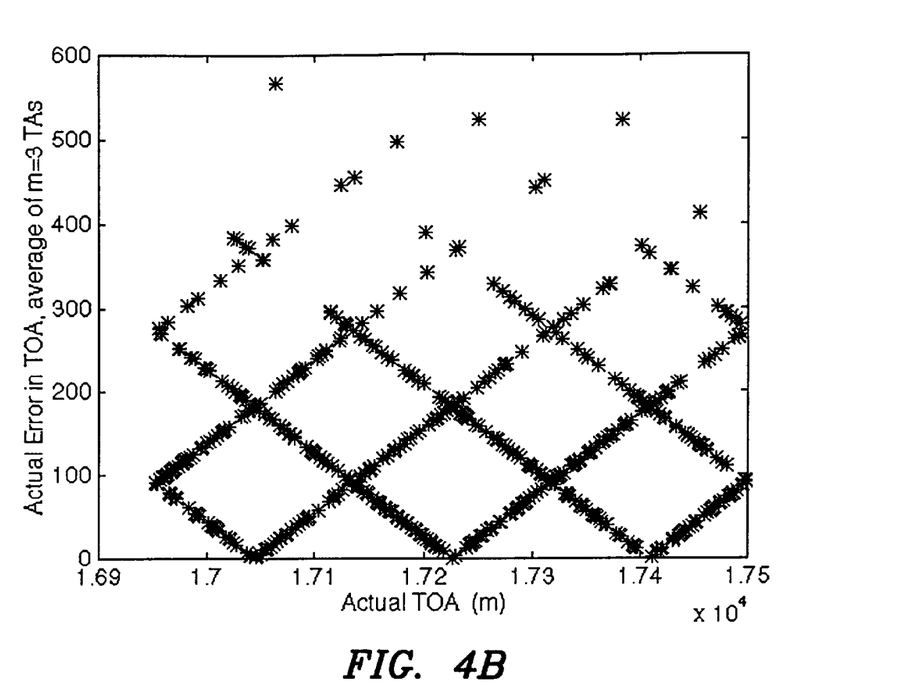
Figure 4C:
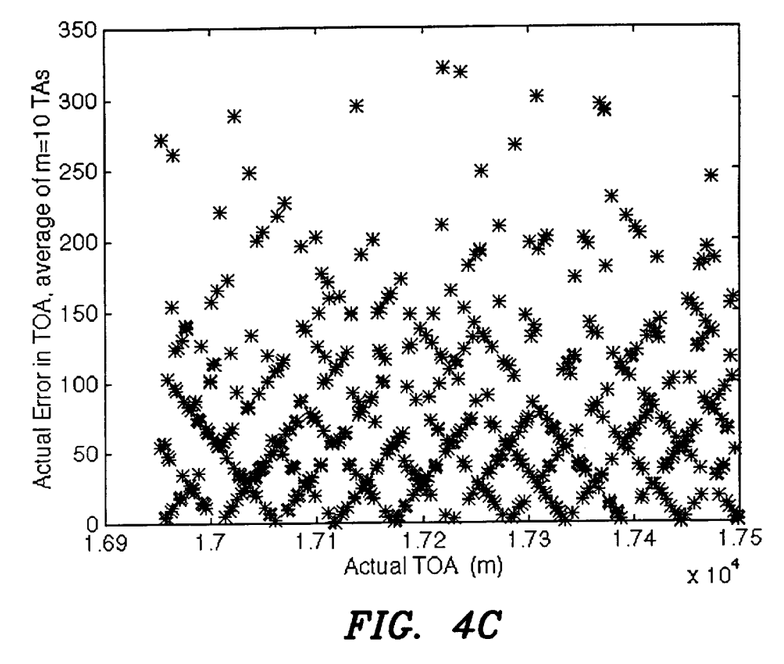

For simplicity, sample simulated results for a GSM system are illustrated in FIGS. 4A, 4B, and 4C with the measurement error σ being T/2. The center of the assigned time slot is utilized as the estimator for τ, the TOA. The behavior of the actual error in the TOA extracted from the reported TA values as a function of the true TOA for a single TA value is shown in FIG. 4A.

It should be understood that for this example, it is assumed that TA is neither close to the minimum nor close to the maximum values. The abscissa is given in meters for one particular example time slot.

FIG. 4B depicts the behavior of the actual error of the TOA when the average of three consecutive TA values (m=3) are used, and FIG. 4C illustrates the behavior of the actual error of the TOA when the average of ten consecutive TA values (m=10) are used to extract the TOA. The patterns arise from the conversion of a TOA measurement from a continuous distribution (a Gaussian distribution for this example) to a discrete TA value. For any given actual TOA, the wrong TA time slot might have been assigned for one or more of the measurements, thus accounting for the discrete nature of the errors.

As can be seen from FIGS. 4A, 4B and 4C, the average error decreases by a substantial amount when m consecutive TA measurements are averaged in order to extract the TOA information. Table 1 hereinbelow shows the reduction in the average mean-squared error (MSE) for m=1, 3, and 10, with σ=T/2. It can be observed that the improvement is better than $\sqrt{m}$ in this example.

| m | average MSE (meters) |
|---|---|
| 1 | 344.2 |
| 3 | 142.9 |
| 10 | 81.16 |

If $\sigma_1$ is the error in the measurement of the actual TOA by the system 305 through the use of a single TA measurement, and $\sigma_m$ is the error in the TOA due to using the average of m consecutive TA values, the gain G, which is the factor by which the error is reduced when m consecutive TA values are averaged to obtain the TOA, is given by Equation 1 as follows:

$$G = \frac{\sigma_1}{\sigma_m} \geq \sqrt{m} \quad (1)$$

Thus, for the case of the stationary MS 300 with the aforementioned conditions, increasing m reduces the average mean-squared error (MSE) by a factor of at least $\sqrt{m}$. However, there is a tradeoff between the improvement in the average MSE and the cost of the number of TA values used with respect to the overhead of the system 305. Therefore, any number of TA values greater than one will effectively improve the average MSE, with the ideal number (m) being chosen by the individual network providers.

If the MS 300 is moving during the positioning process, the choice of m will depend upon the speed of the MS 300 and the TA measurement rate. For example, let y be the periodicity of the measurement of TA values by the system (for GSM systems, TA values are measured once every 0.48 seconds, i.e., y=0.48). Let the speed of the MS 300 be v meters/second. It should be noted that v is the component of the speed towards or away from the serving BSS 310. That is, as long as the MS 300 moves along a circle of constant radius from the serving BSS 310, the value of v can be considered zero. Since the MS 300 speed is a random vector, the average speed toward or away from the serving BSS 310 may be given by $|\vec{v}|/\sqrt{2}$ where $\vec{v}$ is the typical actual two-dimensional velocity vector assumed. The factor $1/\sqrt{2}$ compensates on average for that component of $\vec{v}$ which does not lie directly towards or away from the BTS 310. It should also be noted that it is reasonable to assume that the MS 300 velocity is a constant over the few seconds that it is being considered.

If the contribution to the effective error $\sigma_{e\!f\!f}$ by the movement of the MS 300 is $\sigma_v$, then $\sigma_v$ is given by the expression:

$$\sigma_v = v^* m^* y \quad (2)$$

The optimum value for m can then be obtained by minimizing the function describing $\sigma_{e\!f\!f}$, which for this example is given by the equation:

$$\sigma_{e\!f\!f}^2 = \sigma_v^2 + \sigma_m^2 \quad (3)$$

As an example, if $\sigma_1$ is 344 meters (for a TOA measurement error σ corresponding to half a GSM bit period) and y=0.48 seconds, then for the case of the stationary MS 300 (v=0) from Equation 1 above, m>7 would suffice to produce a TOA with an effective error $\sigma_{e\!f\!f}$ less than or equal to 125 m.

Figure 5:
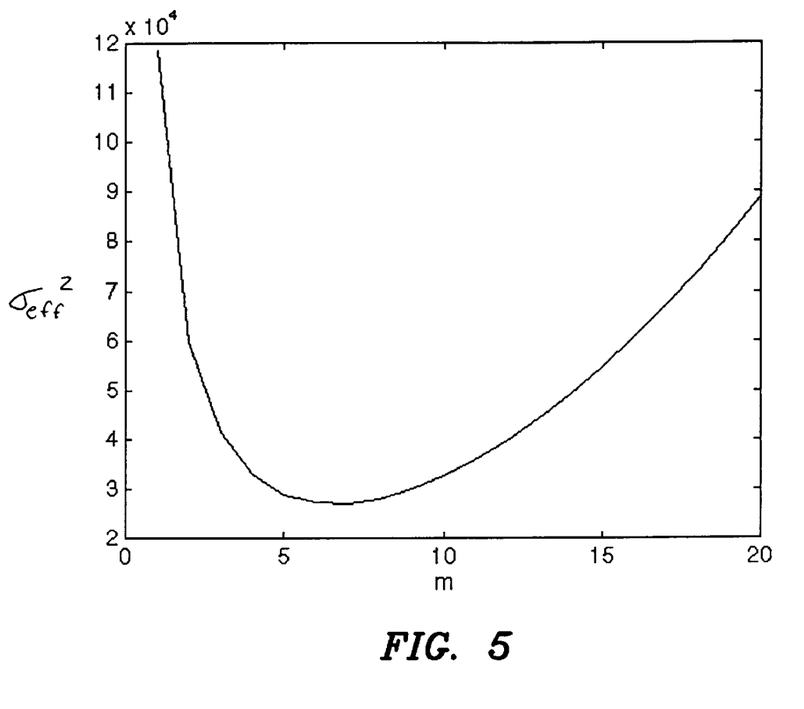
FIG. 5 is a chart depicting the optimum number of TA measurements based upon the speed of a moving mobile terminal to more accurately determine the geographical position of the mobile terminal.

However, if v is 30 meters/second radially (about 67 miles/hour), during the time it takes for the system to make m=7 consecutive TA measurements, the moving MS 300 would have moved a distance given by Equation (2) above or 105 meters. FIG. 5 shows the behavior of $\sigma_{e\!f\!f}^2$ as a function of m for this example. As can be seen, when $\sigma_{e\!f\!f}^2$ is minimum, the optimum value for m is 7. Thus, for a speed of 30 meters/second with a periodicity of measurement of TA values of 0.48 seconds, the optimum number of TA measurements in order to minimize the average MSE of the TOA is m=7. However, the desired net error $\sigma_{e\!f\!f}$ of 125 m could not be obtained. Instead, the minimum net error in FIG. 5 is 165 m.

Therefore, for the case of the moving mobile, the choice of m can be made by minimizing $\sigma_{e\!f\!f}^2$ based upon the actual speed of the MS 300 or, if the speed is unknown, the network operator can minimize σeff² based on an assumed maximum (or typical) radial speed v. In addition, a more accurate value of $\sigma_v$ can be used, given by the following expression:

$$\sigma_v = f^* v^* m^* y \quad (4)$$

where f≦1 is a factor chosen by the network operator. For example, a choice of f=0.5 in Equation (4) hereinabove is a reasonable factor because the final TA value (after averaging) is typically close to the middle of the radial range covered by the MS 300 during the time period under consideration. It should be noted that other choices for f are also possible depending upon the typical circumstances assumed by the network operator.

As will be recognized by those skilled in the art, the innovative concepts described in the present application can be modified and varied over a wide range of applications.

Accordingly, the scope of patented subject matter should not be limited to any of the specific exemplary teachings discussed.

For example, it should be noted that the determination of an accurate Timing Advance value described herein can be used in any Time Division Multiple Access (TDMA) system and is not limited to GSM systems. In addition, any system that measures propagation time from the mobile terminal to the base station can use this technique to improve the accuracy of this measurement.

Furthermore, it should be understood that in addition to emergency calls, positioning services can be used to determine the location of a stolen car, for detection of home zone calls, which are charged at a lower rate, for detection of hot spots for micro cells, for transport and taxi companies to determine the location of their vehicles, or for the subscriber to determine, for example, the nearest gas station, restaurant, or hospital.

What is claimed is:

1. A telecommunications system for determining the location of a given one of a plurality of mobile terminals within a time division multiple access system, said telecommunications system comprising:

a base transceiver station in wireless communication with said given mobile terminal, said base transceiver station being adapted to obtain at least first and second timing advance values associated with said given mobile terminal and receive a signal from said given mobile terminal; and     a base station controller connected to said base transceiver station and adapted to determine an average timing advance value, said average timing advance value being determined by averaging said at least first and second timing advance values received by said base transceiver station, said average timing advance value being used to estimate a time of arrival of said signal from said given mobile terminal to said base transceiver station, said time of arrival being used to determine the location of said given mobile terminal.

2. The telecommunications system of claim 1, wherein said timing advance values are numbers ranging from 0 to 63, each said number corresponding to 550 radial meters around said base transceiver station.

3. The telecommunications system of claim 1, wherein said average timing advance value reduces the average mean-squared error of said time of arrival.

4. The telecommunications system of claim 3, wherein the average mean-squared error of said time of arrival is reduced by a factor of the square root of the number of said timing advance values utilized to determine said average timing advance value.

5. The telecommunications system of claim 4, wherein the number of said timing advance values utilized to determine said average positioning timing advance value is determined by the speed associated with said given mobile terminal.

6. The telecommunications system of claim 4, wherein the number of said timing advance values utilized to determine said average timing advance value is determined by the periodicity of measurement of said timing advance values by said base transceiver station.

7. The telecommunications system of claim 1, further comprising a mobile switching center connected to said base station controller and in wireless communication with said given mobile terminal, said time of arrival being sent to said mobile switching center from said base station controller.

8. The telecommunications system of claim 7, further comprising a positioning center connected to said mobile switching center, said time of arrival being forwarded to said positioning center from said mobile switching center, said positioning center being adapted to calculate the location of said given mobile terminal using said time of arrival.

9. A method for determining the location of a given one of a plurality of mobile terminals within a time division multiple access telecommunications system, said method comprising the steps of:

obtaining, by a base transceiver station in wireless communication with said given mobile terminal, at least first and second timing advance values associated with said given mobile terminal;

receiving a signal from said given mobile terminal at said base transceiver station;

determining, by said base transceiver station, an average timing advance value by averaging said at least first and second timing advance values;

estimating a time of arrival of said signal at said base transceiver station using said average timing advance value; and     determining the location of said given mobile terminal using said time of arrival.

10. The method of claim 9, wherein said timing advance values are numbers ranging from 0 to 63, each said number corresponding to 550 radial meters around said base transceiver station.

11. The method of claim 9, wherein said average timing advance value reduced the average mean-squared error of said time of arrival.

12. The method of claim 11, wherein the average mean-squared error of said time of arrival is reduced by a factor of the square root of the number of said timing advance values utilized to determine said average timing advance value.

13. The method of claim 12, wherein said step of determining said average timing advance value is performed by averaging a number of said timing advance values, said number being determined by the speed associated with said given mobile terminal.

14. The method of claim 12, wherein said step of determining said average timing advance value is performed by averaging a number of said timing advance values, said number being determined by the periodicity of measurement of said timing advance values by said base transceiver station.

15. The method of claim 9, wherein said step of determining the location of said given mobile terminal is performed by sending said time of arrival from said base station controller to a mobile switching center connected to said base station controller and in wireless communication with said given mobile terminal.

16. The method of claim 15, wherein said step of determining the location of said given mobile terminal is further performed by forwarding said time of arrival from said mobile switching center to a positioning center connected to said mobile switching center, said positioning center calculating the location of said given mobile terminal using said time of arrival.

* * * * *

UNITED STATES PATENT AND TRADEMARK OFFICE
CERTIFICATE OF CORRECTION

PATENT NO. : 6,097,959
DATED : August 1, 2000
INVENTOR(S) : Yost et al.

It is certified that error appears in the above-identified patent and that said Letters Patent is hereby corrected as shown below:

Column 4,
Line 66, replace "a" with -- σ --.

Column 6,
Line 33, replace ">" with -- ≥ --.

Column 7,
Line 54, delete "positioning".

Signed and Sealed this

First Day of April, 2003

JAMES E. ROGAN
*Director of the United States Patent and Trademark Office*